(12) United States Patent
Spalding

(10) Patent No.: US 9,224,520 B2
(45) Date of Patent: Dec. 29, 2015

(54) COVER ASSEMBLIES AND METHODS FOR COVERING ELECTRICAL CABLES AND CONNECTIONS

(71) Applicant: Tyco Electronics Corporation, Berwyn, PA (US)

(72) Inventor: Matthew Spalding, Cornelius, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 122 days.

(21) Appl. No.: 13/692,529

(22) Filed: Dec. 3, 2012

(65) Prior Publication Data

US 2014/0151084 A1    Jun. 5, 2014

(51) Int. Cl.
| | |
|---|---|
| *H01B 19/00* | (2006.01) |
| *H01B 3/30* | (2006.01) |
| *H02G 15/00* | (2006.01) |
| *H02G 15/113* | (2006.01) |
| *H02G 15/18* | (2006.01) |
| *H02G 15/184* | (2006.01) |
| *H02G 15/196* | (2006.01) |

(52) U.S. Cl.
CPC .............. *H01B 3/30* (2013.01); *H01B 19/00* (2013.01); *H02G 15/003* (2013.01); *H02G 15/113* (2013.01); *H02G 15/18* (2013.01); *H02G 15/184* (2013.01); *H02G 15/1833* (2013.01); *H02G 15/196* (2013.01); *Y10T 29/49227* (2015.01)

(58) Field of Classification Search
USPC ........................................ 174/88 R, 120 SR
See application file for complete search history.

(56) References Cited

U.S. PATENT DOCUMENTS

| | | | | |
|---|---|---|---|---|
| 4,289,553 | A | | 9/1981 | Nolf |
| 5,070,597 | A | * | 12/1991 | Holt et al. ................. 29/887 |
| 5,422,438 | A | * | 6/1995 | Lamome ................. 174/84 C |
| 5,606,148 | A | * | 2/1997 | Escherich ............. H01R 9/031 |
| | | | | 174/84 R |
| 7,858,883 | B2 | * | 12/2010 | Seraj .................. H01R 4/72 |
| | | | | 174/88 R |
| 7,863,521 | B2 | | 1/2011 | Campbell et al. |
| 7,901,243 | B1 | | 3/2011 | Yaworski |
| 2006/0037687 | A1 | * | 2/2006 | Buekers ............... H02G 15/003 |
| | | | | 156/53 |
| 2010/0307821 | A1 | | 12/2010 | Simonsohn |
| 2011/0100671 | A1 | * | 5/2011 | Seraj et al. ................ 174/68.1 |

FOREIGN PATENT DOCUMENTS

CA            2050287 A1    11/1990

OTHER PUBLICATIONS

"BoPet" Wikipedia, Retrieved Date: Apr. 10, 2012, From URL: http://en.wikipedia.org/w/index.php?title=BoPET&printable=yes (5 pages).

(Continued)

*Primary Examiner* — Tremesha S Willis
*Assistant Examiner* — Michael E Moats, Jr.
(74) *Attorney, Agent, or Firm* — Myers Bigel Sibley & Sajovec, PA

(57) ABSTRACT

A cold-applied cover assembly for environmentally protecting an electrical substrate includes a cold-applied polymeric cover member configured to surround the electrical substrate, and a gas transmission barrier (GTB) layer. The GTB layer is configured to surround the electrical substrate to define a protected chamber containing the electrical substrate and to inhibit ingress of a gas through the cover assembly into the protected chamber.

14 Claims, 12 Drawing Sheets

(56) References Cited

OTHER PUBLICATIONS

"CSJA-3-2820-ARMR Series" Tyco Electronics, PII 56273, Revision AA, PCN 5J535-1-000, Effective Date: Feb. 9, 2011 (9 pages).

"Moisture vapor transmission rate" Wikipedia, Retrieved Date: Apr. 23, 2012, From URL: http://en.wikipedia.org/w/index.php?title=Moisture_vapor_transmission_rate&printable=yes (3 pages).

* cited by examiner

US 9,224,520 B2

COVER ASSEMBLIES AND METHODS FOR COVERING ELECTRICAL CABLES AND CONNECTIONS

FIELD OF THE INVENTION

The present invention relates to electrical cables and connections and, more particularly, to protective covers for electrical cables and electrical connections.

BACKGROUND OF THE INVENTION

In the electrical utilities industry, maintaining cable integrity may be critical. A loss of cable integrity, for example, a short circuit in a high voltage cable, may result in a crippling power outage or, even worse, a loss of life. One everyday task that may pose a great threat to cable integrity is the formation of electrical connections.

When electrical connections are formed, a bare metal surface may be exposed such as a splice connector. These bare metal surfaces may be particularly hazardous when formed in the field where they are exposed to the environment. This environment may include rocks and other sharp objects as well as moisture when the connection is to be buried under ground and rainfall when the connection is to be suspended in the air. Thus, there is a need to protect such electrical connections from the environment.

Moisture migration into electrical cable accessories is a known problem that can lead to premature failure. This migration is caused by temperature and pressure differentials that cause moisture to migrate through polymeric materials (typically referred to as moisture vapor transmission (MVT)). Metallized film has been integrated into heat shrink wrap-around sleeves.

SUMMARY OF THE INVENTION

According to embodiments of the present invention, a cold-applied cover assembly for environmentally protecting an electrical substrate includes a cold-applied polymeric cover member configured to surround the electrical substrate, and a gas transmission barrier (GTB) layer. The GTB layer is configured to surround the electrical substrate to define a protected chamber containing the electrical substrate and to inhibit ingress of a gas through the cover assembly into the protected chamber.

According to method embodiments of the present invention, a method for environmentally protecting an electrical substrate includes providing a cold-applied cover assembly including a cold-applied polymeric cover member and a gas transmission barrier (GTB) layer. The method further includes mounting the cold-applied cover assembly about the electrical substrate such that: the cold-applied polymeric cover member surrounds the electrical substrate; and the GTB layer surrounds the electrical substrate to define a protected chamber containing the electrical substrate and to inhibit ingress of a gas through the cover assembly into the protected chamber.

According to embodiments of the present invention, a cold-applied cover assembly for environmentally protecting an electrical substrate includes a cover body, a mass of gel sealant mounted on the cover body, and a chemical transmission barrier (CTB) layer interposed between the cover body and the mass of gel sealant. The CTB layer serves as an anti-poisoning layer inhibiting the transmission of a chemical or chemicals from the cover body to the mass of gel sealant.

According to method embodiments of the present invention, a method for forming a cold-applied cover assembly for environmentally protecting an electrical substrate includes mounting a mass of gel sealant on a cover body and a chemical transmission barrier (CTB) layer relatively positioned such that the CTB layer is interposed between the cover body and the mass of gel sealant. The CTB layer serves as an anti-poisoning layer inhibiting the transmission of a chemical or chemicals from the cover body to the mass of gel sealant.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
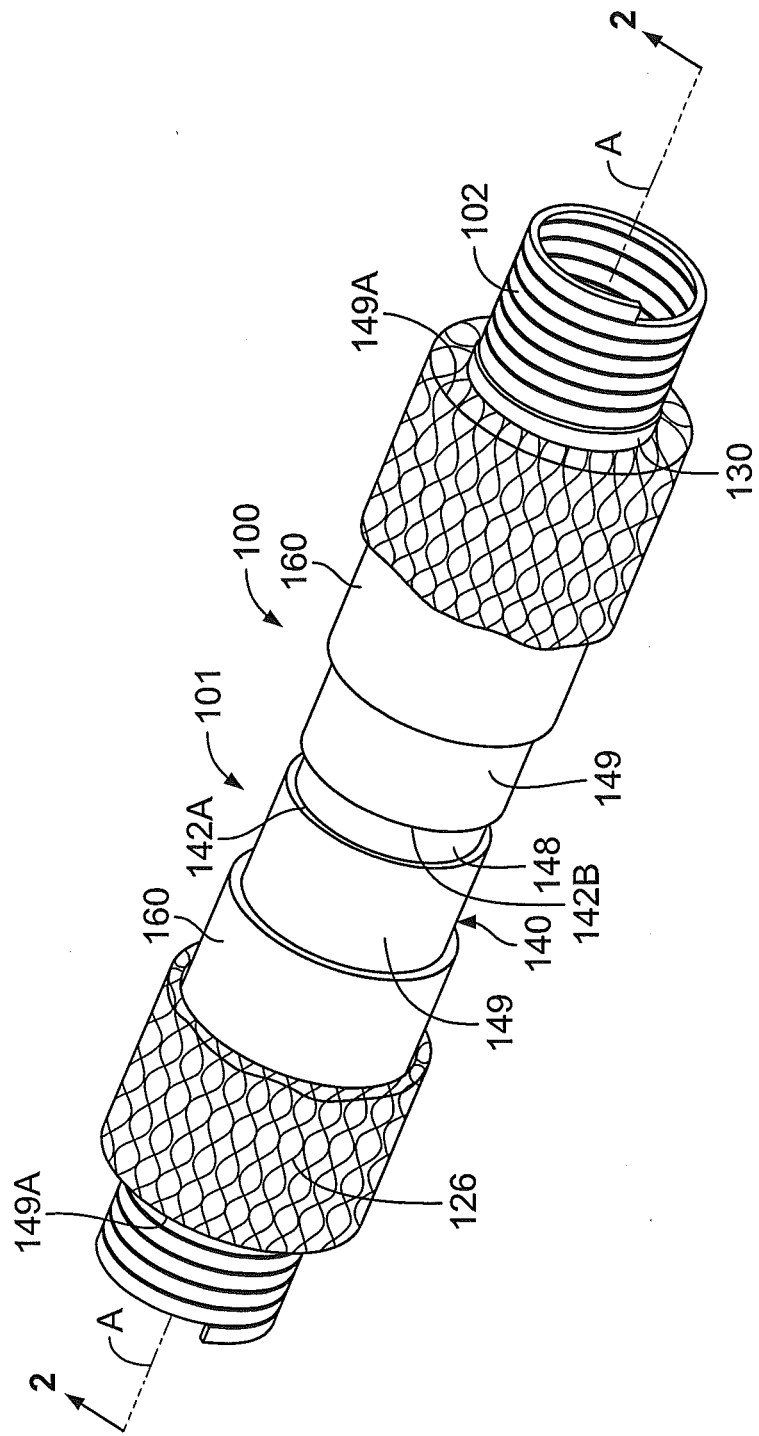
FIG. 1 is a perspective view of a cover assembly according to embodiments of the present invention mounted on a holdout.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "monolithic" means an object that is a single, unitary piece formed or composed of a material without joints or seams.

As used herein, "cold-applied" or "cold-applied cover" means that the cover or component can be assembled or installed about a substrate (e.g., a cable) without requiring the use of applied heat at the time of installation.

As used herein, "cold shrink" or "cold shrink cover" means that the cover or component can be shrunk or contracted about a substrate (e.g., a cable) without requiring the use of applied heat.

Figure 2:
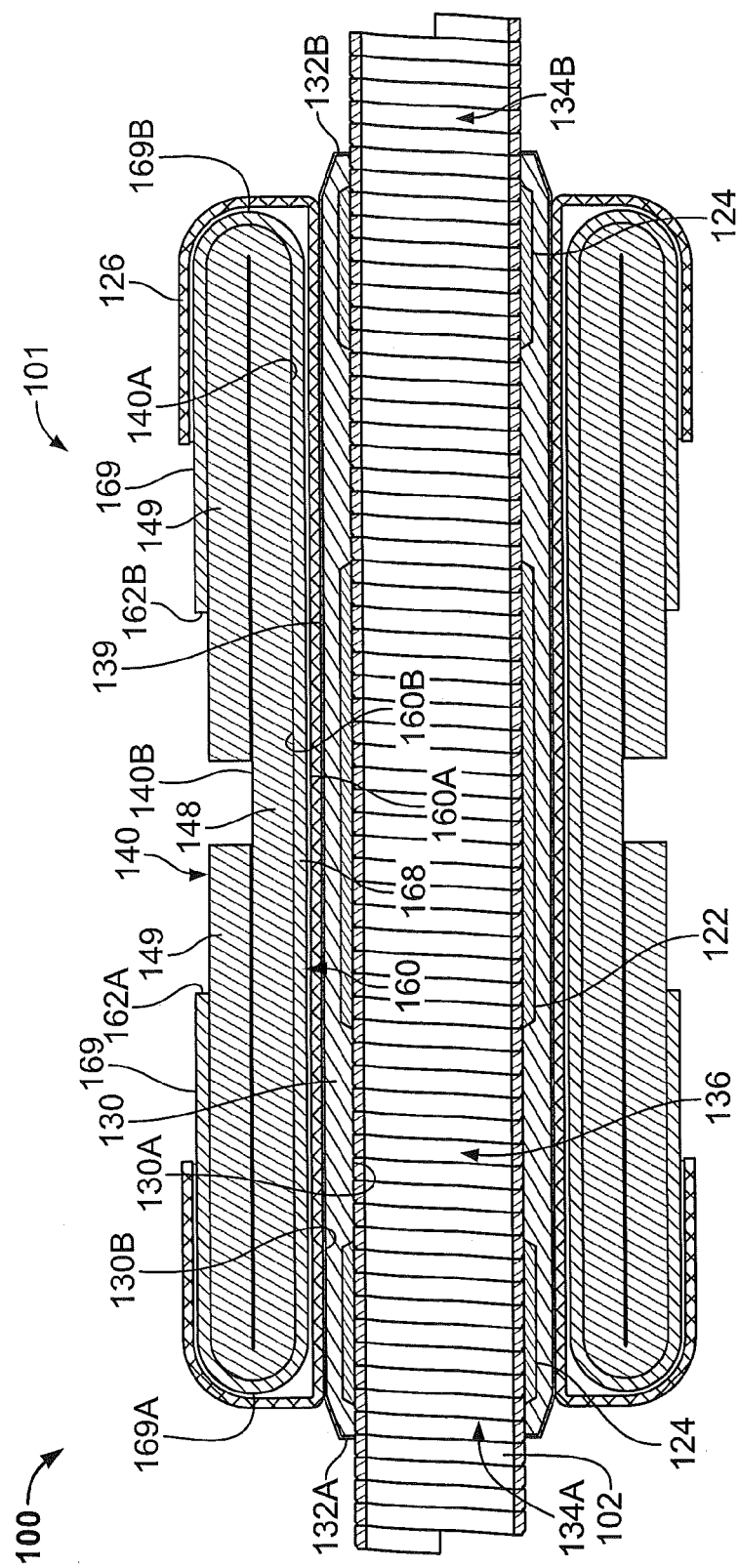
FIG. 2 is a cross-sectional view of the cover assembly and holdout of FIG. 1 taken along the line 2-2 of FIG. 1.

With reference to FIGS. 1-5, a cover assembly 100 according to some embodiments of the present invention is shown therein. The cover assembly 100 may be provided as a pre-expanded unit 101 including a holdout device 102, as shown in FIGS. 1 and 2, wherein the cover assembly 100 is in an expanded state or position.

Figure 5:
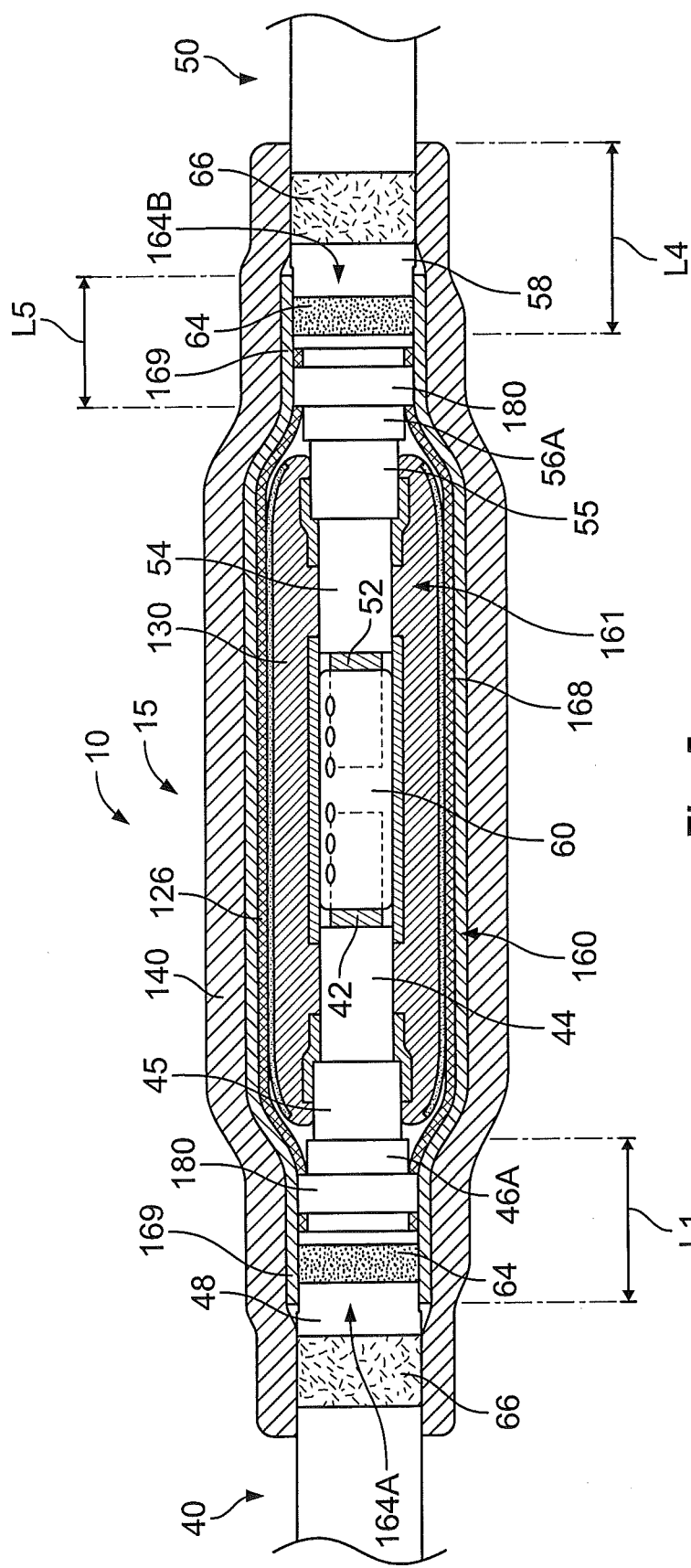
FIG. 5 is a cross-sectional view of a connection assembly including the cover assembly of FIG. 1.

The cover assembly 100 may be used to cover and electrically insulate electrical substrates such as cables and connectors. The cover assembly 100 may be used to cover and seal a connection or splice between two or more cables 40, 50 including an electrical connector 60 to form a connection assembly 10 as shown in FIG. 5. According to some embodiments, the cables 40, 50 are concentric neutral cables. According to some embodiments, the cables 40, 50 are metal tape shielded or longitudinally corrugated (LC) metal shielded cables.

The cover assembly 100 may be deployed and mounted on the intended substrate in a retracted state or position as shown in FIG. 5 and discussed in more detail below. According to some embodiments, the cover assembly 100 is a cold shrink cover, meaning that it can be shrunk or retracted about the substrate without requiring the use of applied heat.

The cover assembly 100 includes a Faraday cage layer 122, stress cone layers 124, an inner sleeve (or insulation body) 130, a semiconductor layer 139, an outer sleeve (or re-jacket) 140, a metal shield mesh layer 126, and a gas transmission barrier (GTB) layer 160. Referring to FIG. 1, the cover assembly 100 has a lengthwise axis A-A. The Faraday cage layer 122, the stress cone layers 124, the inner sleeve 130, the semiconductor layer 139, the outer sleeve 140, the metal shield mesh layer 126, and the GTB layer 160 are provided as an integral, unitary structure extending lengthwise along the axis A-A. According to some embodiments, the cover assembly 100 is provided pre-installed and pre-expanded on the holdout 102.

The inner sleeve 130 has opposed inner and outer surfaces 130A and 130B, and opposed ends 132A, 132B. The inner sleeve 130 is tubular and defines an axially extending conductor through passage 136 that communicates with opposed end openings 134A, 134B.

The Faraday cage layer 122 is illustrated as a generally tubular sleeve bonded to the inner surface 130A of the inner sleeve 130. The Faraday cage layer 122 may be formed of a suitable elastically conductive elastomer. In use, the Faraday cage layer 122 may form a Faraday cage to provide an equal potential volume about the connector 60 so that an electric field is cancelled in the surrounding air voids.

The stress cone layers 124 are illustrated as generally tubular sleeves bonded to the inner surface 130A of the inner sleeve 130 at either end 132A, 132B thereof. The stress cone layers 124 may be formed of a suitable electrically conductive elastomer. In use, the stress cone layers 124 may serve to redistribute the voltage along the surface of the cable insulation 44, 54 to reduce or prevent the degradation of the insulation 44, 54 that might otherwise occur.

According to some embodiments, the layers 122, 124 are formed of a material having a Modulus at 100 percent elongation (M100) in the range of from about 0.68 to 0.88 MPa.

The semiconductor layer 139 fully circumferentially surrounds the inner sleeve 130. According to some embodiments, the semiconductor layer 139 is coextensive with the inner sleeve 130.

The shield mesh layer 126 fully circumferentially surrounds the inner sleeve 130. According to some embodiments, the shield mesh layer 126 includes opposed end sections that extend beyond the ends of the inner sleeve 130 but do not extend as far out as the outer sleeve 140. The shield mesh layer 126 may be formed of braided or woven copper filaments, for example.

With reference to FIG. 2, the GTB layer 160 fully circumferentially surrounds the shield mesh layer. 126. The GTB layer 160 has opposed inner and outer surfaces 160A and 160B and opposed ends 162A, 162B (FIG. 5). The GTB layer 160 is tubular and defines an axially extending through passage that communicates with opposed end openings 164A, 164B. When mounted on the holdout 102, outer sections 169 of the GTB layer 160 are folded back on an intermediate section 168 at annular folds 169A. As discussed in more detail below, the GTB layer 160 includes one or more layers of a material having very low permeability to a gas or gases of concern (in some embodiments, water vapor) and, in service, serves to prevent or inhibit the transmission of said gas or gases to regions of the splice or cover assembly of concern (e.g., to the conductors 42, 52 or the connector 60).

The outer sleeve 140 fully circumferentially surrounds the GTB layer 160. The outer sleeve 140 has opposed inner and outer surfaces 140A and 140B, and opposed ends 142A, 142B. The inner sleeve 140 is tubular and defines an axially extending conductor through passage that communicates with opposed end openings 144A, 144B. When mounted on the holdout 102 as shown in FIGS. 1 and 2, outer sections 149 of the outer sleeve 140 are folded back on an intermediate section 148 of the outer sleeve 140 at annular folds 149A.

The semiconductor layer 139 can be formed of any suitable electrically semiconductive material. According to some embodiments, the semiconductor layer 139 is formed of an elastically expandable material. According to some embodiments, the semiconductor layer 139 is formed of an elastomeric material. According to some embodiments, the semiconductor layer 139 is formed of carbon black and silicone. Other suitable materials may include carbon black and EPDM.

The inner sleeve 130 can be formed of any suitable material. According to some embodiments, the inner sleeve 130 is formed of a dielectric or electrically insulative material. According to some embodiments, the inner sleeve 130 is formed of an elastically expandable material. According to some embodiments, the inner sleeve 130 is formed of an elastomeric material. According to some embodiments, the inner sleeve 130 is formed of liquid silicone rubber (LSR). Other suitable materials may include EPDM or ethylene propylene rubber (EPR). According to some embodiments, the inner sleeve 130 has a Modulus at 100 percent elongation (M100) in the range of from about 0.4 to 0.52 MPa.

According to some embodiments, the thickness of the inner sleeve 130 is in the range from about 0.07 to 2 inches. According to some embodiments, the length of the inner sleeve 130 is in the range from about 8 to 30 inches.

The outer sleeve 140 can be formed of any suitable material. According to some embodiments, the outer sleeve 140 is formed of an electrically insulative material. According to some embodiments, the outer sleeve 140 is formed of an elastically expandable material. According to some embodiments, the outer sleeve 140 is formed of an elastomeric material. According to some embodiments, the outer sleeve 140 is formed of ethylene propylene diene monomer (EPDM) rubber. Other suitable materials may include neoprene or other rubber. According to some embodiments, the outer sleeve 140 has a Modulus at 100 percent elongation (M100) in the range of from about 0.6 to 1.1 MPa.

According to some embodiments, the thickness of the outer sleeve 140 is in the range of from about 0.11 to 0.25 inch. According to some embodiments, the length of the outer sleeve 140 is in the range of from about 15 to 35 inches.

The holdout 102 can be formed of any suitable material. According to some embodiments, the holdout 102 is formed of a rigid cardboard or plastic. According to some embodiments, the holdout 102 includes a strip helically wound to form a rigid cylinder as illustrated, for example. The holdout device 102 may be factory installed. In some embodiments, the cover assembly 100 may instead be pre-expanded in the field using a suitable expansion tool.

The GTB layer 160 may be formed of any suitable material(s). The GTB layer 160 may consist of a single layer or multiple layers. According to some embodiments, each of the GTB layers 160 and sublayers are described hereinbelow are substantially free of voids or have minimal voids from the end 160A to the end 160B.

Figure 3A:
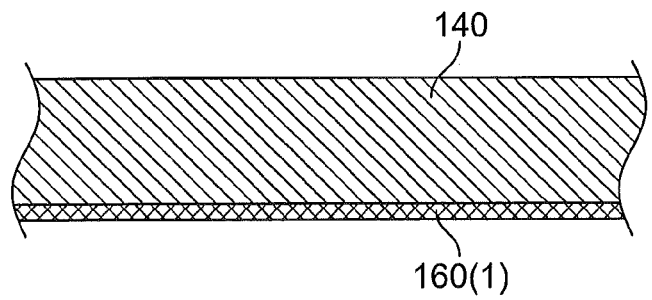
FIGS. 3A-3D are enlarged, fragmentary, cross-sectional views of an outer sleeve and various alternative gas transmission barrier layers forming a part of the cover assembly of FIG. 1.

With reference to FIG. 3A, according to some embodiments, the GTB layer 160 (referred to here as GTB layer 160(1)) is a nonpolymeric material layer coating or laminated to the outer sleeve 140. In some embodiments, the GTB layer 160(1) is a metal layer. Suitable metal layers may be formed from aluminum or copper. In some embodiments, the GTB layer 160(1) is a metal layer having a thickness in the range of from about 5 to 30 microns and, in some embodiments, from about 5 to 10 microns.

In some embodiments, the GTB layer 160(1) is a layer of a ceramic. In some embodiments, the GTB layer 160(1) is a ceramic layer having a thickness in the range of from about 5 to 30 microns and, in some embodiments, from about 5 to 15 microns.

Figure 3B:
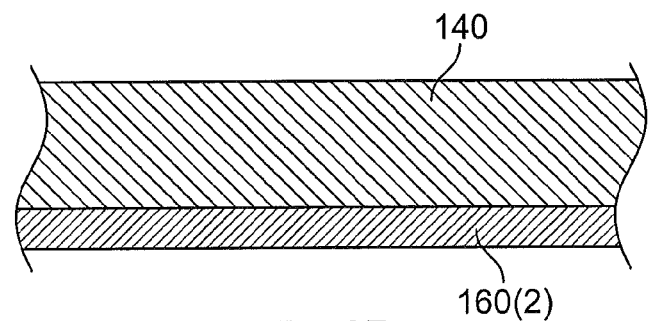

With reference to FIG. 3B, according to some embodiments, the GTB layer 160 (referred to here as GTB layer 160(2)) is a polymeric material layer coating or laminated to the outer sleeve 140. According to some embodiments, the GTB layer 160(2) is formed of biaxially oriented polyethylene terephthalate (BoPET). Other suitable polymeric materials for the GTB layer 160(2) may include PET or PET-G (polyethylene terephtalate glycol-modified). According to some embodiments, the GTB layer 160(2) has a thickness in the range of from about 5 to 30 microns. According to some embodiments, the GTB layer 160(2) is a BoPET film having a thickness in the range of from about 5 to 30 microns and, in some embodiments, from about 5 to 15 microns.

Figure 3C:
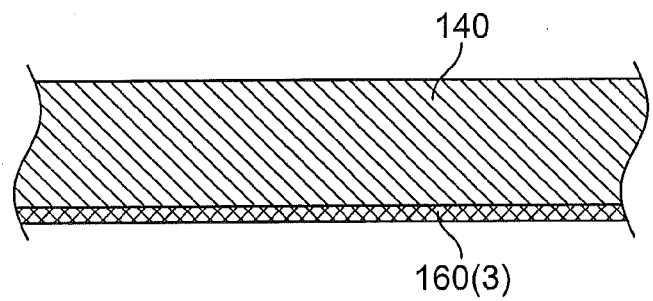

With reference to FIG. 3C, according to some embodiments, the GTB layer 160 (here referred to as GTB layer 160(3)) is formed of polytetrafluoroethylene (PTFE). According to some embodiments, the GTB layer 160(3) is a PTFE coating having a thickness in the range of from about 5 to 30 microns and, in some embodiments, from about 5 to 15 microns.

Figure 3D:
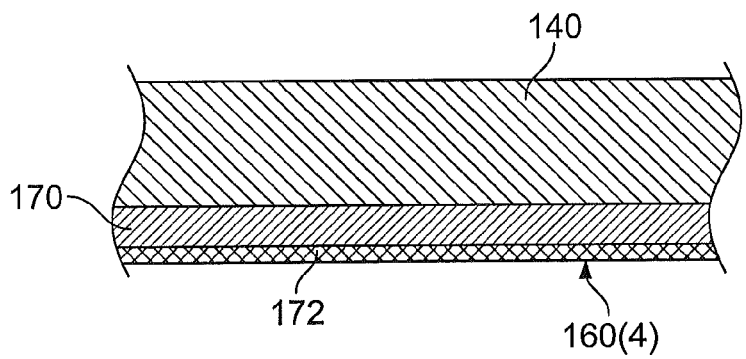

With reference to FIG. 3D, according to some embodiments, the GTB barrier layer 160 (here referred to as the GTB layer 160(4) is a composite layer including two or more distinct sublayers 170, 172 bonded or laminated to one another. The sublayer 170 may serve as a substrate for the sublayer 172 to facilitate the integrity of the sublayer 172 and/or the attachment of the sublayer 172 to the outer sleeve 140. The sublayers 170, 172 may each have very low gas permeability (e.g., moisture vapor permeability) to provide an even lower combined gas permeability.

According to some embodiments, the sublayer 170 is a polymeric film and the sublayer 172 is PTFE or a nonpolymeric coating such as a metal (e.g., aluminum or copper) and/or a ceramic. According to some embodiments, the sublayer 170 is a BoPET film and the sublayer 172 is a metallization coating thereon.

According to some embodiments, the sublayers 170 and 172 are both polymeric film layers. In some embodiments, the polymeric film layers 170, 172 are each selected from the group consisting of BoPET, PET, PET-G and low density polyethylene (LDPE). In some embodiments, one of the sublayers 170, 172 is formed of PET and the other sublayer 170, 172 is formed of PET-G. In some embodiments, the PET/PET-G GTB layer 160(4) has a thickness in the range of from about 5 to 30 microns, 5 to 15 microns. In further embodiments, a third polymeric film layer is bonded or laminated to a multi-layer polymeric film composite as just described. According to some embodiments, the third layer is an LDPE layer. In some embodiments, the GTB layer 160 includes a PET film layer bonded or laminated to a PET-G film layer, and an LDPE film layer bonded or laminated to one of the PET and PET-G layers. In some such embodiments, the combined PET/PET-G layer has a thickness in the range of from about 5 to 30 microns (in some embodiments, 5 to 15 microns) and the LDPE layer has a thickness in the range of 15 to 50 microns (in some embodiments, 20 to 35 microns). The polymeric layers as discussed above may be bonded to one another using a polyurethane adhesive.

According to some embodiments, the GTB layer 160(4) has a combined thickness in the range of from about 5 to 80 microns and, in some embodiments, from about 25 to 50 microns.

According to some embodiments, the GTB layer 160 has a water vapor transmission rate (WVTR) of less than about 0.08 grams/m$^2$/day measured in accordance with ASTM test method 1249 (1990 edition) at 37.8° C. (100° F.) with 100% relative humidity (RH) and, in some embodiments, in the range of from about 0.01 to 0.08 grams/m$^2$/day.

According to some embodiments, the WVTR of the GBT layer 160 is less than 10% of the WVTR of the outer sleeve 140. According to some embodiments, the WVTR of the GBT layer 160 is less than 1% of the WVTR of the inner sleeve 130.

According to some embodiments, the length of the GBT layer 160 is at least coextensive with the length of the shield mesh 126. According to some embodiments, the GBT layer 160 is about 50 to 100 mm longer than the mesh 126 on each side of the joint.

The cover assembly 100 may be formed by any suitable method and apparatus. According to some embodiments, the inner sleeve 130 is molded and the outer sleeve 140 is thereafter insert overmolded about the inner sleeve 130.

According to further embodiments, the inner sleeve 130 and the outer sleeve 140 are separately formed (for example, by molding or extrusion) and thereafter the outer sleeve 140 is mounted on the inner sleeve 130.

According to some embodiments, the inner sleeve 130 is unitarily molded. According to some embodiments, the outer sleeve 140 is unitarily molded.

Alternatively, one or more of the inner sleeve 130 and the outer sleeve 140 may be extruded. According to some embodiments, one or both of these components is unitarily extruded.

The GTB layer 160 can be applied and bonded to the outer sleeve 140 by any suitable method, such as sputter coating, dip coating, flood coating, co-extruding, or laminating (with or without an intervening adhesive layer).

Figure 4:
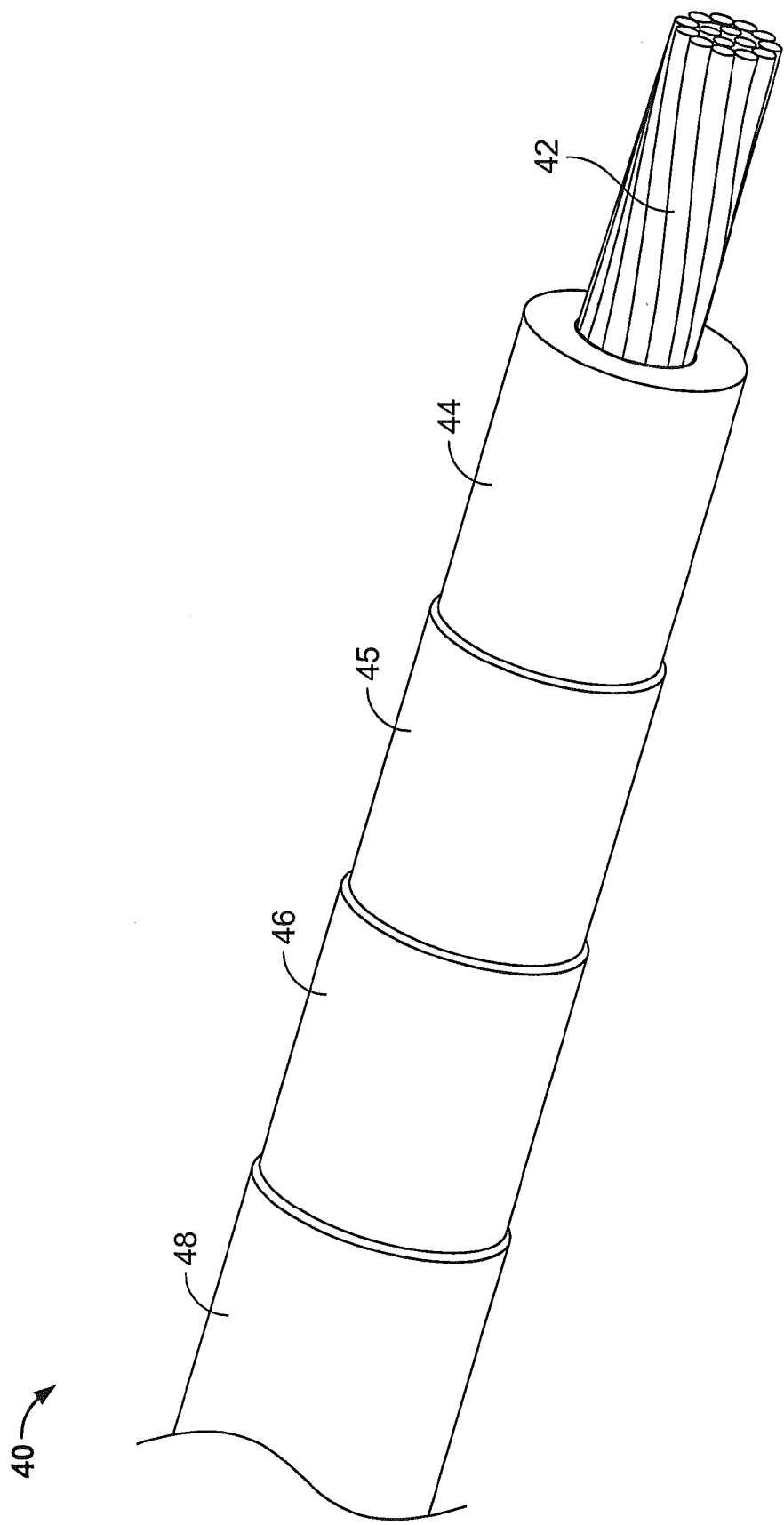
FIG. 4 is a perspective view of an electrical cable for use with the cover assembly of FIG. 1.

Referring now to FIGS. 4 and 5, the cover assembly 100 may be applied over a splice connection 15 (FIG. 5) between a pair of electrical power transmission cables 40, 50 to form a connection assembly 10. According to some embodiments, the cables 40, 50 are low-voltage or medium-voltage (e.g., between about 5 and 46 kV) power transmission cables.

As shown in FIG. 4, the cable 40 includes a primary electrical conductor 42, a polymeric insulation layer 44, a semiconductor layer 45, a metal electromagnetic radiation shield layer 46, and a jacket 48, with each component being concentrically surrounded by the next.

According to some embodiments and as shown, the shield layer 46 is a metal tape, foil, strip or sheath fully circumferentially surrounding the semiconductor layer 45 along the length of the cable. The metal strip may be longitudinally or helically wrapped about the semiconductor layer 45, for example. According to some embodiments, the cable 40 is an LC shielded cable and the shield layer 46 is a thin corrugated metal layer. In other embodiments, the shield layer 46 may include individual wires, which may be helically wound about the semiconductor layer 45.

The primary conductor 42 may be formed of any suitable electrically conductive materials such as copper (solid or stranded). The polymeric insulation layer 44 may be formed of any suitable electrically insulative material such as crosslinked polyethylene (XLPE) or EPR. The semiconductor layer 45 may be formed of any suitable semiconductor material such as carbon black with silicone. The shield layer 46 may be formed of any suitable material such as copper. The jacket 48 may be formed of any suitable material such as EPDM or PVC.

The cable 50 (FIG. 5) is similarly constructed with a primary electrical conductor 52, a polymeric insulation layer 54, a semiconductor layer 55, a metal shield layer (a segment 56A of which is shown in FIG. 5), and a jacket 58 corresponding to components 42, 44, 45, 46 and 48, respectively.

The connection assembly 10 may be formed and the cover assembly 100 may be installed as follows. The cables 40, 50 are prepared as shown in FIG. 4 such that a segment of each layer extends beyond the next overlying layer. A segment 46A of the shield layer 46 extends at least a prescribed distance beyond the end of the jacket 48. Similarly, a segment 56A of the shield layer of the cable 50 extends at least a prescribed distance beyond the end of the jacket 58.

The pre-expanded unit 101 is slid over one of the cables 40, 50. According to some embodiments, the inside diameter of the holdout 102 is greater than the outer diameter of each cable 40, 50 such that the inner diameter of the holdout 102 is sufficient to receive the prepared cable 40, 50 and the connector 60 without undue effort. According to some embodiments, the inner diameter of the holdout 102 is at least as great as the outer diameter of the largest portion of the cables or connectors that are to be received in the passage 136. The pre-expanded unit 101 may be retained or parked on a cable 40, 50 until the operator is ready to install the cover assembly 100 on the cables 40, 50.

The electrical connector 60 is secured to each primary conductor 42, 52 to mechanically and electrically couple the primary conductors 42, 52 to one another as shown in FIG. 5. The connector 60 may be any suitable type of connector such as a metal crimp connector.

The pre-expanded unit 101 is then slid into position over the connector 60. The holdout 102 is then removed from the cover assembly 100, thereby permitting the elastomeric sleeves 130, 140 to relax and radially retract about the cables 40, 50 and the connector 60 as shown in FIG. 5. According to some embodiments, the inner sleeve 130 overlaps and engages the semiconductor layers 44, 54 of the cables 40, 50.

The shield mesh 126 is rolled outwardly onto the semiconductor layers 45, 55 as shown in FIG. 5. A retainer 180 (e.g., a metal mesh web or clamp) can be wrapped about each cable 40, 50 as also shown in FIG. 5 to secure the end edges of the shield mesh 126. The retainers 180 may be wrapped about exposed ends of the shield layers 46, 56 to electrically connect the shield mesh 126 to the shield layers 46, 56.

Strips of flowable sealant 64 (FIG. 5) are applied to the outer surfaces of the cable jackets 48, 58. According to some embodiments, the sealant 64 is a mastic.

Strips of flowable sealant 66 (FIG. 5) are applied to the outer surfaces of the cable jackets 48, 58. According to some embodiments, the sealant 66 is a mastic.

The operator then rolls each of the extension sections 149 of the outer sleeve 140 axially outwardly to cover the adjacent sections of the cables 40 and 50, respectively. According to some embodiments, at least a portion of each extension section 149 overlaps a respective portion of each cable jacket 48, 58 and engages the associated sealant strip 66 to provide a moisture seal. According to some embodiments, the axial length of overlap between each extension section 149 and the underlying jacket 48, 58 is at least 50 mm.

When the extension sections 149 are rolled out, the extension sections 169 of the GTB layer 160 extend axially outwardly to cover adjacent sections of the shield layers 46, 56 and the jackets 148, 158, as shown in FIG. 5. Thus, according to embodiments of the invention, the GTB layer 160 extends axially to and, in some embodiments, axially overlaps and circumferentially surrounds a section of each cable metal shield layer 46, 56. According to some embodiments, the GTB layer 160 overlaps each cable shield layer 46, 56 an axial distance L1 (FIG. 5) of at least 25 mm and, in some embodiments between about 50 and 100 mm. Each extension section 169 engages a respective sealant strip 64 to provide a moisture seal.

The relaxed inner diameter of the outer sleeve 140 is less than at least the outer diameter of the jacket layers 48, 58. Therefore, the outer sleeve 140 exerts a radially inwardly compressive or clamping force or pressure (due to elastic tension) onto the GTB layer extension sections 169 and the cables 40, 50. The outer sleeve 140 thereby effects a liquid tight seal at the interfaces between the extension sections 169 and the cable jackets 48, 58 and at the interfaces between the cable jackets 48, 58 and the outer sleeve 140. These seals can protect the cable and the splice from the ingress of environmental moisture. According to some embodiments the relaxed inner diameter of the inner sleeve 130 is at least 10% less than the smallest diameter cable upon which the cover assembly 100 is intended to be installed.

The cover assembly 100 is thereby fully installed to form the connection assembly 10 as shown in FIG. 5.

In service, the GTB layer 160 defines an environmentally protected interior region or chamber 161 (FIG. 5) containing the splice connection 15 serves to inhibit or prevent the ingress of gases from the surrounding environment into the chamber 161. In particular, the GTB layer 160 prevents or highly inhibits the transmission of moisture vapor into the chamber 161. As a result, the GTB layer 160 can reduce or prevent degradation of the cables 40, 50 (e.g., so-called "water trees") caused by moisture induced chemical reactions. The GTB layer 160 may also increase the life of the splice connection 15 by reducing moisture induced corrosion.

By extending to, and preferably overlapping with, the cable metal shield layers 46, 56, the GTB layer 160 combines with the shield layers 46, 56 (which themselves serve as gas (including water vapor) transmission barriers) to form an axially continuous sleeve that fully circumferentially surrounds the splice 15 and the adjacent cable sections. In this way, the installed cover assembly 100 envelopes the splice without presenting an opening for intrusion of the environmental gases such as moisture vapor.

According to some embodiments, an electrical connector of a different type may be used in place of the shear bolt connector 60.

Cover assemblies according to some embodiments of the present invention may include additional layers and/or certain layers may be omitted. For example, cover assemblies in accordance with some embodiments of the present invention may be formed without the inner sleeve 130 or the shield mesh 126. One or more additional layers may be interposed between the inner sleeve 130 and the outer sleeve 140.

Figure 6:
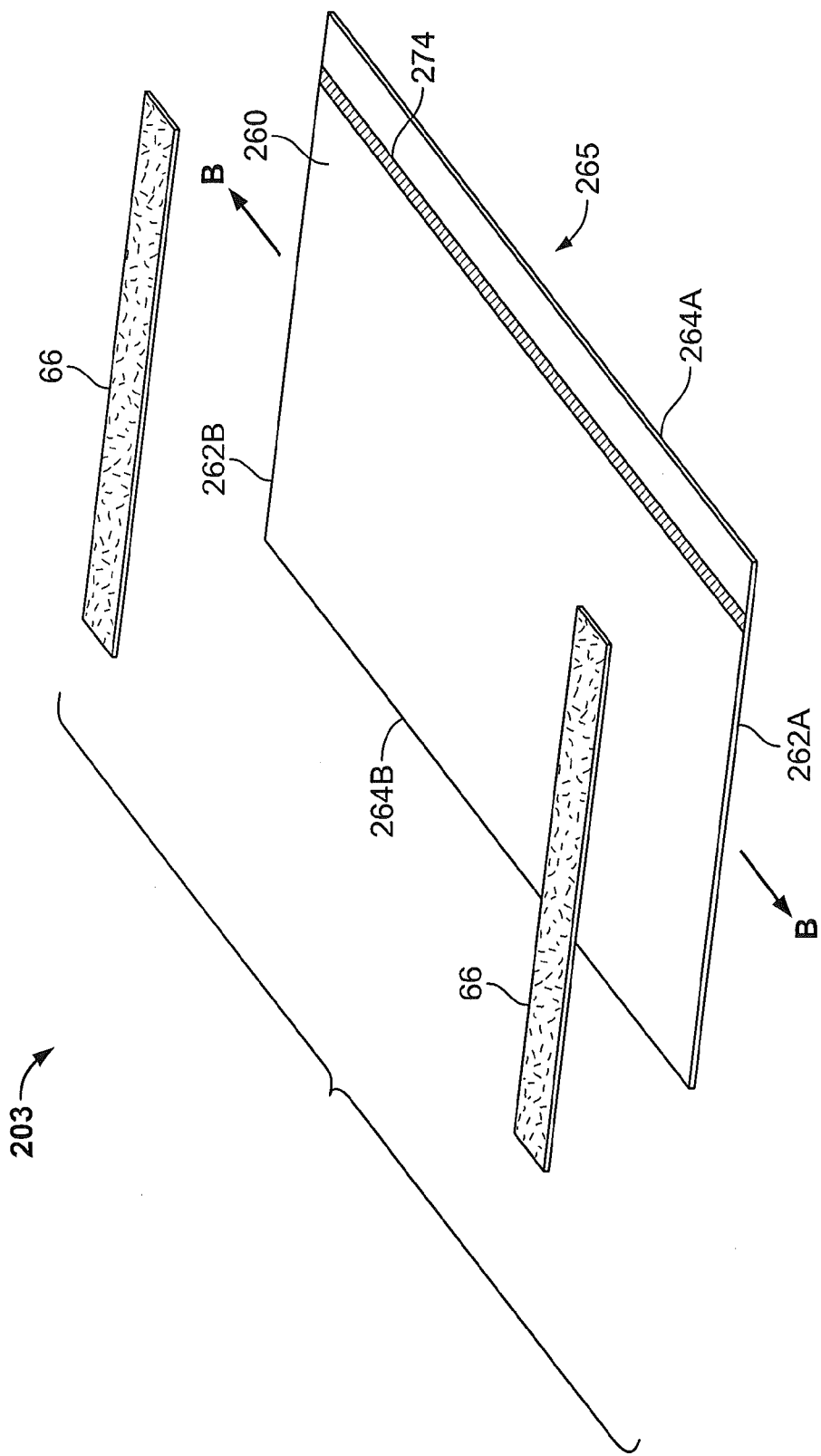
FIG. 6 is a perspective view of a gas transmission barrier kit according to further embodiments of the present invention.

With reference to FIG. 6, a gas transmission barrier kit 203 for use with a cold-applied cover or rejacketing sleeve is shown therein. The kit 203 includes a gas transmission barrier (GTB) member 265 and a pair of sealant strips 64.

The GTB member 265 includes a gas transmission barrier (GTB) layer 260 corresponding to the GTB layer 160 of the cover assembly 100 and a strip of adhesive 274. According to some embodiments, the GTB layer 260 has the characteristics or properties as described above with regard to the GTB layer 160. The GTB member 265 may consist essentially of the GTB layer 260. For example, the GTB layer 260 may be a composite layer constructed as described above with regard to the composition GTB layer 160(4) and may form the entirety of the GTB member 265 other than the adhesive 274. Alternatively, the GTB member 265 may include an additional layer to provide structural support for the GTB layer 260.

The GTB layer 260 has a lengthwise axis B-B, laterally extending opposed ends 262A, 262B, and axially extending opposed side or lateral edges 264A, 264B.

The adhesive strip 274 extends axially along one lateral edge of the GTB layer 260. The adhesive 274 may be any suitable adhesive such as a pressure sensitive adhesive. A release liner (not shown) may be provided to protect the adhesive until time for installation.

The sealant strips 64 may be formed of the same material (e.g., mastic) as described above with regard to the cover assembly 100.

The kit 203 may be used in combination with a cover sleeve or rejacket to form a covered splice corresponding to the covered splice 10. In this case, the GTB member 265 is wrapped around the splice and adjacent cable sections to form a sleeve with the lateral edges 264A, 264B overlapping. The GTB member 265 is secured in this position by the adhesive strip 274. The end portions of the GTB layer 260 adjacent the ends 262A, 262B are sealingly bonded to the cable jackets 48, 58 by the sealant strips 64 in the same manner as described above. A rejacket or cover sleeve is thereafter installed over the GTB member 265. Optionally an insulating sleeve corresponding to the sleeve 130 and/or a shield corresponding to the shield mesh 126 may be installed over the splice prior to installing the GTB member 265.

Figure 7:
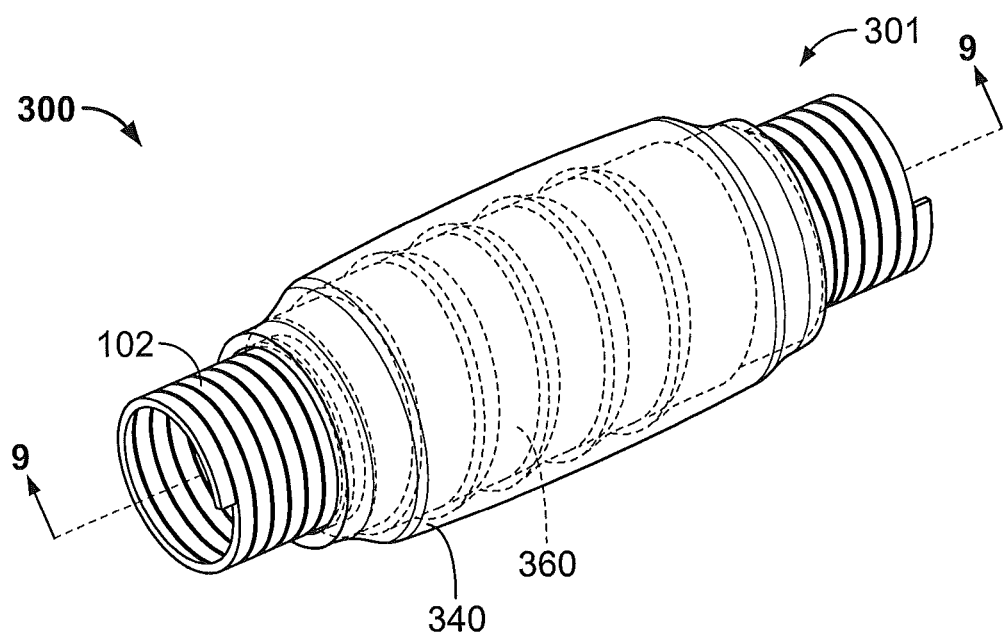
FIG. 7 is a perspective view of a cover assembly according to further embodiments of the present invention mounted on a holdout.
Figure 8:
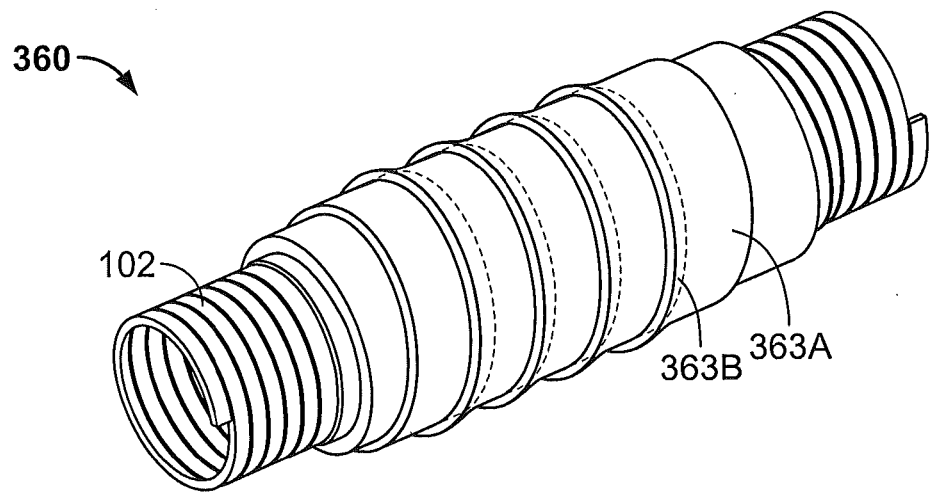
FIG. 8 is a perspective view of the cover assembly of FIG. 7 on the holdout and with an outer sleeve member thereof removed for the purpose of explanation.
Figure 9:
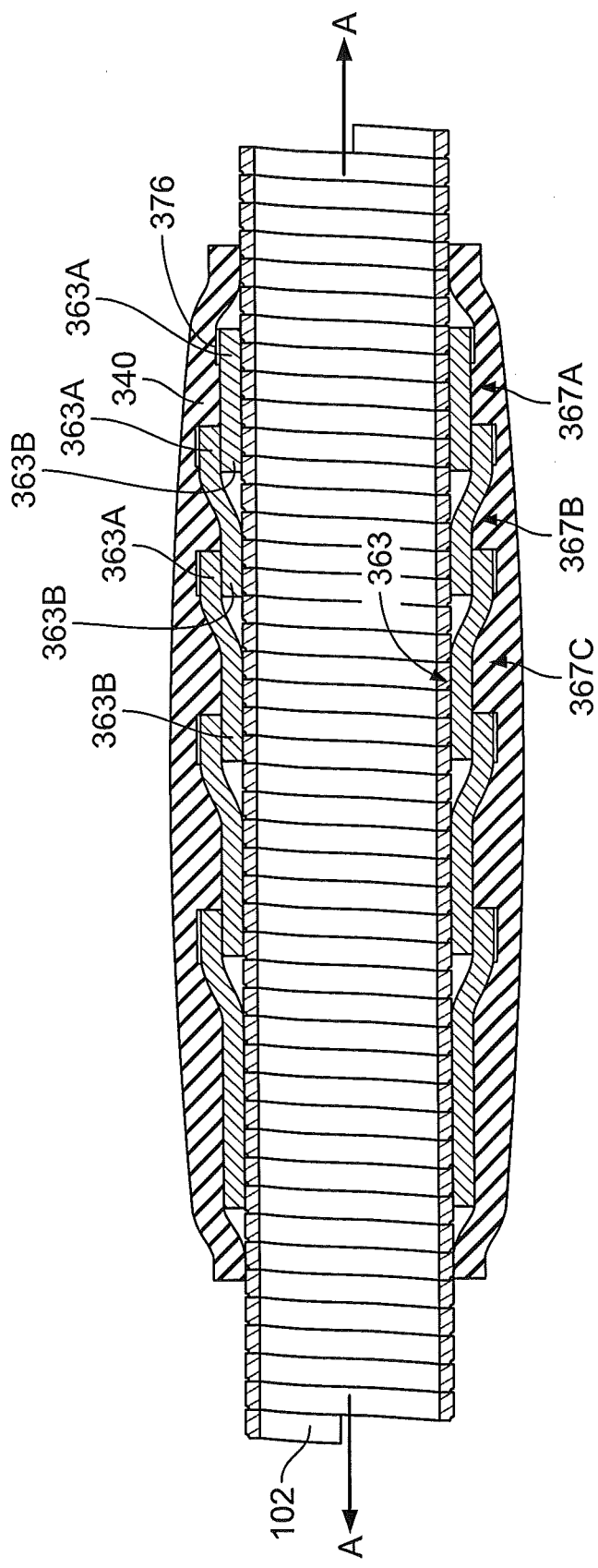
FIG. 9 is a cross-sectional view of the cover assembly and holdout of FIG. 7 taken along the line 9-9 of FIG. 7.

With reference to FIGS. 7-9, a cover assembly 300 according to further embodiments of the present invention is shown therein. The cover assembly 300 may be provided as a pre-expanded unit 301 including a holdout device 102 as shown in FIGS. 7 and 9, wherein the cover assembly 300 is in an expanded state or position.

The cover assembly 300 includes an outer elastomeric sleeve or rejacket 340, which may be constructed as described with regard to the outer sleeve 140. The cover assembly 300 further includes a gas transmission barrier (GTB) layer 360 corresponding to the GTB layer 160. The GTB layer 360 may be constructed in the same manner as discussed above with regard to the GTB layers 160(1), 160(2), 160(3), 160(4). The cover assembly 300 may optionally include one or more additional components such as an insulator sleeve corresponding to the sleeve 130 and/or a shield mesh corresponding to the shield mesh 126.

The GTB layer 360 differs from the GTB layer 160 in that the GTB layer 360 is provided in the form of a strip 363 that is helically wound about the longitudinal axis A-A of the cover assembly 300. With reference to FIG. 9, a first lateral side section 363A of the strip 363 is bonded to the inner surface of the sleeve 340 (e.g., by adhesive 376). A second lateral side section 363B of the strip 363 is not bonded to the sleeve 340. The strip 363 is wrapped in an overlapping or imbricated configuration so that the strip section 363B successively underlaps the strip section 363A as the strip 363 advances across the length of the cover assembly 300. That is, the strip 363 has an axially extending series of slidably underlapping strip segments 367A, 367B, 367C, etc.

In use, the cover assembly 300 can be deployed over a splice in the same manner as described above with regard to the cover assembly 100 by removing the holdout 102. As the sleeve member 340 contracts, the segments 367A, 367B, 367C, etc. of the strip 363 can slide relative to one another, permitting the strip 363 to telescopingly contract with no or reduced buckling. In this manner, the GTB layer 360 can adapt to the diameters of the splice and cables.

Figure 10:
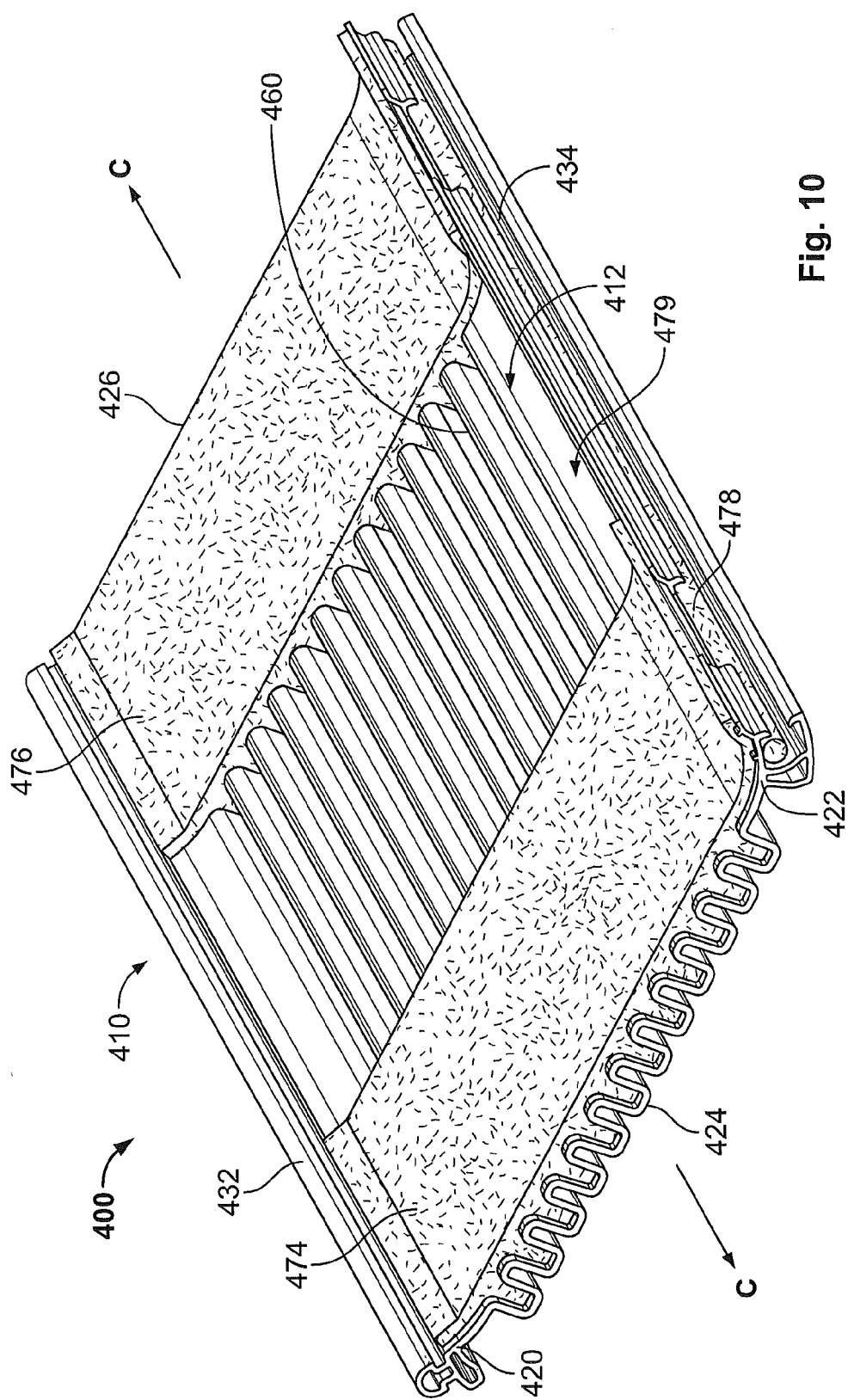
FIG. 10 is a perspective view of a wrap-around cover assembly according to further embodiments of the present invention.
Figure 11:
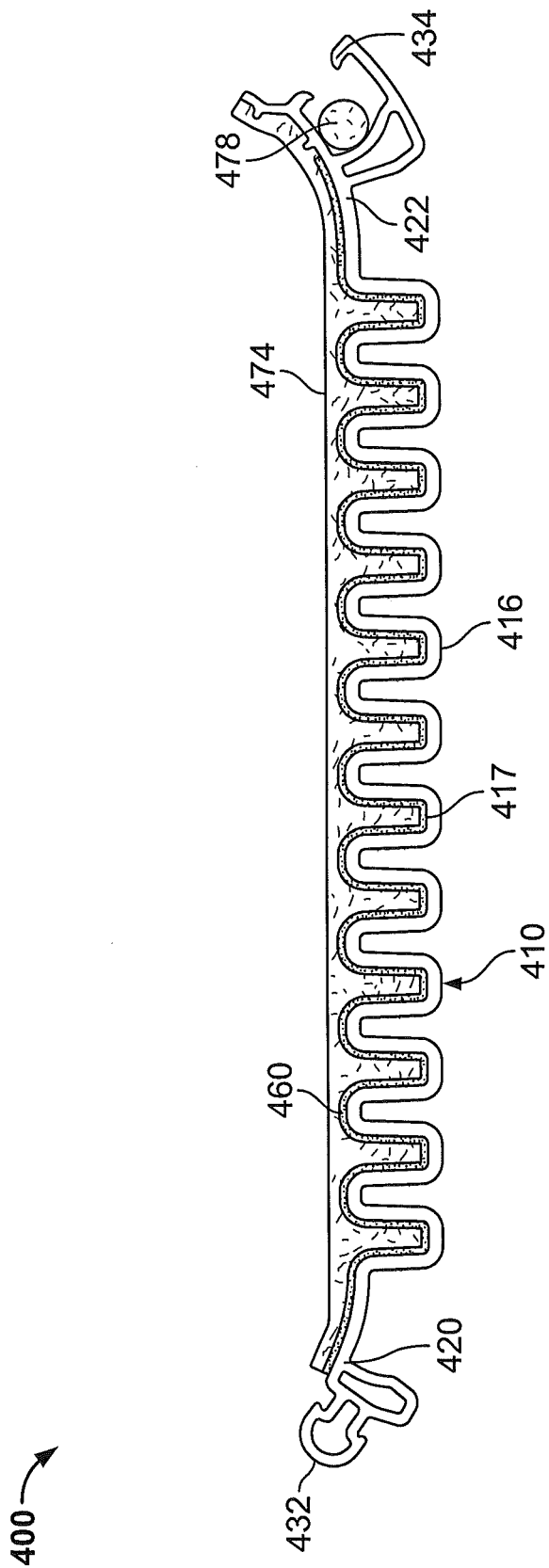
FIG. 11 is an end view of the cover assembly of FIG. 10.
Figure 12:
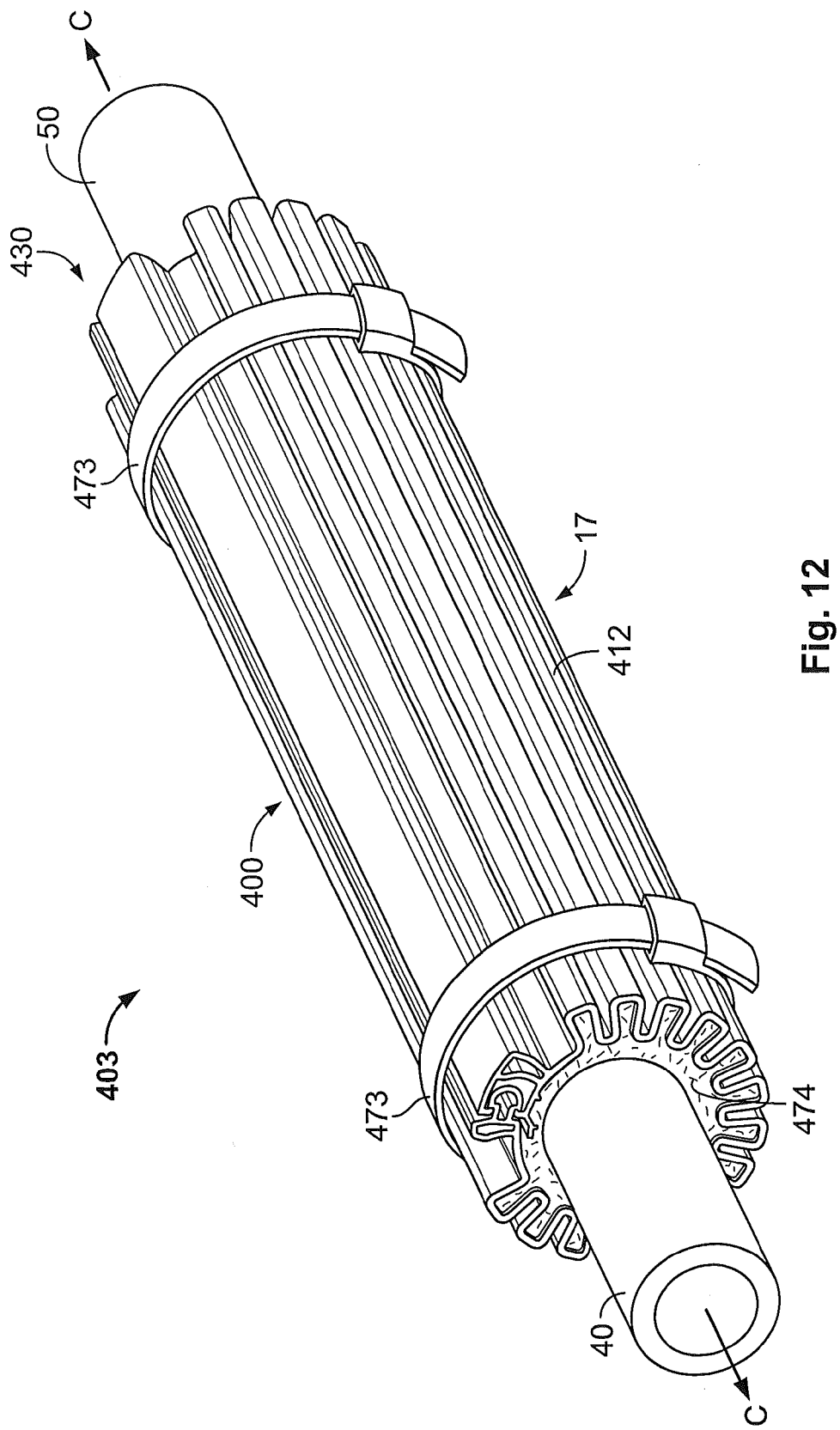
FIG. 12 is a perspective view of the cover assembly of FIG. 10 installed over a splice.

With reference to FIGS. 10-12, a wrap around cable re-jacketing or cover assembly 400 according to embodiments of the present invention is shown therein. The cover assembly 400 is made from an electrically insulating material. The cover assembly 400 may be used to cover and electrically insulate electrical substrates such as cables and connectors. The cover assembly 400 may be assembled into a sleeve assembly 403 (FIG. 12) to cover and seal a connection or splice 17 between two or more cables 40, 50 and a connector to form an environmentally protected connection assembly as shown in FIG. 12, or to cover a damaged segment of a cable. Similarly, the cover assembly 400 may be used to re-jacket a section of a cable where the jacket of the cable has been removed or compromised. The splice or other suitable section(s) of the cable(s) may be contained in an environmentally sealed chamber defined within the sleeve assembly 403.

The cover assembly 100 includes a wrap-around body 410, a pair of cable sealant masses, strips or patches of sealant 474, 476, a closure mastic mass or strip 478, and a gas transmission barrier (GTB) layer 460.

The wrap-around body 410 defines a lengthwise axis C-C (FIG. 10) and includes a longitudinally extending body section 412 and a connector system 430. The longitudinally extending body section 412 has a first longitudinal closure edge 420, a second longitudinal closure edge 422 laterally spaced from and parallel to the first longitudinal edge 420, opposed laterally extending end edges 424, 426, an exterior side or surface 416 and an interior side or surface 417.

The body section 412 has corrugations 428 undulating in lateral cross-section. As shown, the corrugations 428 are U-shaped in lateral cross-sectional profile; however, the corrugation profile may instead have a W-shaped zig-zag pattern or any other suitable pattern.

The connector system 430 includes a first connector portion 432 and a second connector portion 434 mateable therewith. The first connector portion 432 is configured as a pin or rib member coupled to and extending from the first longitudinal edge portion 420. The rib member has an insert member in the form of a pin or rib with a leading edge having a tapered profile (as shown, semi-circular).

The second connector portion 440 is configured as a socket member coupled to and extending from the second longitudinal edge 422. The socket member defines a socket configured to connectably engage with the rib of the first connector portion 432. The socket includes a pair of opposed seating or latching elements or barbs.

According to some embodiments, the sealant patches 474, 476 are patches of mastic. However, as discussed below, other types of sealant (e.g., gels) may be employed. The cable mastic patches 474, 476 are mounted on the body 410 adjacent the end edges 424 and 426, respectively, and in longitudinally spaced apart relation to define a gap 479 therebetween.

As shown, the gap 479 is free of sealant on the body section 412. However, according to other embodiments, additional cable mastic patches may be provided on the body section 412 between the patches 474, 476 or the cable sealant may extend continuously from the location of the cable mastic patch 474 to the location of the cable mastic patch 476.

The closure mastic strip 478 is disposed in the socket of the second connector portion 434, which thereby serves as a closure sealant chamber. More particularly, the closure mastic strip 478 extends lengthwise along the length of the socket at least from the cable mastic patch 474 to the cable mastic patch 476.

The wrap-around body 410 is made from an electrically insulating material. This material may be a variety of electrically insulating materials as will be understood by those skilled in the art including, but not limited to, thermoplastics and thermoplastic elastomers. According to some embodiments, the electrically insulating material is a thermoplastic elastomer. The thermoplastic elastomer may be various thermoplastic elastomers as will be understood by those skilled in the art, and is preferably selected from the group consisting of polypropylene/rubber blends and polyurethanes. The most preferable thermoplastic elastomers are the polypropylene/rubber blends commercially available from Advanced Elastomer Systems of Akron, Ohio and sold under the Santoprene™ trademark. The longitudinally extending body section 412 may have a hardness as measured on the Shore A scale of at least about 55, preferably at least about 80, and more preferably at least about 90. The longitudinally extending body section 412 preferably has a flexural modulus between a lower limit and an upper limit. The lower limit is preferably about 2,000 psi, more preferably about 4,000 psi, and most preferably about 6,000 psi. The upper limit is preferably about 100,000 psi, more preferably about 25,000 psi, and most preferably about 10,000 psi.

According to some embodiments, the longitudinally extending body section 412 has a 100% tensile modulus as measured using ASTM D412 between a lower limit and an upper limit. In some embodiments, the lower limit is about 250 psi, more preferably about 800 psi, and most preferably about 1300 psi. The upper limit is preferably about 3000 psi, more preferably about 1800 psi, and most preferably about 1600 psi. According to some embodiments, the longitudinally extending body section 412 has a tension set as measured using ASTM D412 of less than about 60 percent, more preferably less than about 50 percent, and most preferably less than about 20 percent. The longitudinally extending body section 412 may have a lateral range taking of at least about 15%, more preferably of at least about 30%, and most preferably of at least about 50%. The longitudinally extending body section 412 may have a longitudinal range taking of less than about 10%, more preferably less than about 5%, and most preferably less than about 2%.

The cable mastic patches 474, 476 may be formed of any suitable flowable sealing mastic. According to embodiments of the present invention, the cable mastic patches 474, 476 include a polymer that is at least partially crosslinked (semi-crosslinked). While cable mastic patches 474, 476 include a polymer that is at least partially crosslinked, the mastics are still deformable and adherent to the material of the body 410 and the cable insulation. However, the crosslinking in the cable mastic patches prevents them from flowing from the body 410 at operating temperatures (according to some embodiments, in an operating temperature range of from −20 to 135° C.). In some embodiments, cable mastic patches 474, 476 include crosslinked butyl rubber. Other suitable mastics may include mastics including synthetic rubber or synthetic polymer mastics. Furthermore, according to some embodiments, the cable mastic patches 474, 476 are electrically insulative. Suitable polymers that may be included in the cable mastic patches 474, 476 include S1278 sold by TE Connectivity.

The closure mastic strip 478 may be formed of any suitable flowable sealing mastic. According to some embodiments, the closure mastic strip 478 is formed of a different mastic composition than the cable mastic patches 474, 476. According to some embodiments, the closure mastic strip 478 is a softer mastic than the cable mastic patches 474, 476 at an installation temperature (according to some embodiment, an installation temperature in the range of from about −20 to 45 degrees Celsius). In some embodiments, closure mastic strip 478 includes butyl rubber, and in some embodiments, closure mastic strip 478 includes synthetic rubber or synthetic polymer mastics. The mastic 478 may be semi-crosslinked. According to some embodiments, the mastic 478 is not free flowing at least in an operating temperature range of from −20 to 95° C. Furthermore, according to some embodiments, the closure mastic strip 478 is electrically insulative. Suitable polymers that may be included in the closure mastic strip 478 include S1337 type mastic sold by TE Connectivity.

The wrap-around body 410 may be formed using any suitable technique. In some embodiments, a web of electrically insulating material is extruded and then cut to form a wrap-around cable body having a first end and a second end.

The GTB layer 460 may be constructed in the same manner as described above with respect to the GTB layer 160. The GTB layer 460 is bonded to the inner surface 417 of the body 410. Thus, the layer 460 may be, for example, a metal coating directly bonded to the inner surface 417, a BoPET (or other) film laminated to the inner surface 417, or a composite metallized BoPET layer laminated to the inner surface 417.

According to some embodiments, the GTB layer 460 extends across the full width of the body section 412 and at least the lengthwise span of the gap 479. In some embodiments, the GTB layer 460 extends beneath the mastic patches 474, 476. In some embodiments, the GTB layer 460 extends the full length of the body section 412 from end edge 424 to end edge 426.

The cover assembly 400 may be installed in the following manner over a splice connection 17 between a pair of electrical power transmission cables 40, 50 to form an environmentally protected connection assembly 40, 50. According to some embodiments, the cables 40, 50 are low-voltage or medium-voltage (e.g., between about 120 Volts and 46 kV) power transmission cables.

With the cover assembly 400 in an open position as shown in FIG. 10, the cover assembly 400 is positioned adjacent the cables 40, 50 at the axial location where the cover assembly 400 is to be installed. The body 410 is then wrapped circumferentially about the cables 40, 50 (i.e., about the sleeve axis C-C and the cable axis) to bring the connector portions 432, 434 into engagement. In this manner, the body 410 is latched closed to form a continuous tubular member from end to end and defining the cable chamber. In particular, the GTB layer 460 is configured as a tubular sleeve (sealed by the mastic 474, 476 at its ends) defining an environmentally protected chamber containing the connector and adjacent cable portions. According to some embodiments, the body 410 is sized such that its relaxed inner diameter when closed is less than the outer diameter of the cables 40, 50 so that the body 410 will fit closely against the cables and the corrugations 428 will be at least somewhat distended. However, in some embodiments, the relaxed inner diameter when closed is greater than the outer diameter of the cables 40, 50 so that an external or supplemental compression member is required to tighten the body 410 onto the cables 40, 50.

As the body 410 is forced into closure about the cables 40, 50, the cable mastic patches 474, 476 are forced radially inwardly into engagement with the cables 40, 50 so that the cable mastic patches 474, 476 fully circumferentially surround the cables 40, 50 and each form a circumferential environmental seal about the respective cable. The environmental seal provided by the closure mastic strip 478 and the environmental seals provided by the cable mastic patches 474, 476 combine to environmentally seal the cable chamber. This seal can protect the cables and the splice from the ingress of environmental moisture, for example.

According to some embodiments, supplemental compression members are mounted on the cover assembly 400 to resist displacement of the body 410 along the cables, limit radial and axial expansion of the body 410, and/or to radially inwardly compress the body 410 into sealing contact with the cable mastic patches 474, 476 and the cable mastic patches 474, 476 into sealing contact with the cables. In accordance with some embodiments, the compression members are cable ties, zip ties or tie wraps 473. Other suitable compression members may include spring hose clamps, rope, strap clamps, worm drive hose clamps, or snap hose clamps.

In some embodiments, the cover assembly 400 is constructed and installed such that the GTB layer 460 overlaps metal shield layers of the cables 40, 50 in the same manner as described above with regard to the cover assembly 100.

According to further embodiments, the gas transmission barrier kit 203 (FIG. 6) may be applied around a splice or the like and then covered by a wrap-around rejacket. For example, the installed GTB member 265 may be encased in a wrap-around rejacket corresponding to the cover assembly 400 except that the GTB layer 460 is omitted.

While the sealant patches 474, 476 are described above as mastic patches, other types of sealant may be used. According to some embodiments, the sealant patches 474, 476 are patches of gel sealant.

As used herein, "gel" refers to the category of materials which are solids extended by a fluid extender. The gel may be a substantially dilute system that exhibits 3rd no steady state flow. As discussed in Ferry, "Viscoelastic Properties of Polymers," ed. P. 529 (J. Wiley & Sons, New York 1980), a polymer gel may be a cross-linked solution whether linked by chemical bonds or crystallites or some other kind of junction. The absence of the steady state flow may be considered to be the definition of the solid-like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Gels for use in this invention may be silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al. (hereinafter "Dubrow '300"), the disclosures of each of which are hereby incorporated herein by reference. These fluid-extended silicone gels may be created with non-reactive fluid extenders as in the previously recited patents or with an excess of a reactive liquid, e.g., a vinyl-rich silicone fluid, such that it acts like an extender, as exemplified by the Sylgard® 527 product commercially available from Dow-Corning of Midland, Mich. or as disclosed in U.S. Pat. No. 3,020,260 to Nelson. Because curing is generally involved in the preparation of these gels, they are sometimes referred to as thermosetting gels. The gel may be a silicone gel produced from a mixture of divinyl terminated polydimethylsiloxane, tetrakis (dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetra-methylcyclotetrasiloxane (reaction inhibitor for providing adequate pot life).

Other types of gels may be used, for example, polyurethane gels as taught in the aforementioned Debbaut '261 and U.S. Pat. No. 5,140,476 to Debbaut (hereinafter "Debbaut '476") and gels based on styrene-ethylene butylenestyrene (SEBS) or styrene-ethylene propylene-styrene (SEPS) extended with an extender oil of naphthenic or nonaromatic or low aramatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be used are EPDM rubber-based gels, as described in U.S. Pat. No. 5,177,143 to Chang et al.

Yet another class of gels which may be used are based on anhydride-containing polymers, as disclosed in WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites (e.g., Irgafox™ 168, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co. of Wayne, N.J.), light stabilizers (e.g., Cyasorb UV-531, commercially available from American Cyanamid Co. of Wayne, N.J.), and flame retardants such as halogenated paraffins (e.g., Bromoklor 50, commercially available from Ferro Corp. of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd through Mitsui & Co. of Cleveland, Ohio, and hydrotalcite). Other suitable additives include colorants, biocides, tackifiers and the like described in "Additives for Plastics, Edition 1" published by D.A.T.A., Inc. and The International Plastics Selector, Inc., San Diego, Calif.

The hardness, stress relaxation, and tack may be measured using a Texture Technologies Texture Analyzer or like machine, having a load cell to measure force, a 5 gram trigger, and ¼ inch (6.35 mm) stainless steel probe. For measuring the hardness, for example, of a 20 mL glass vial containing 12 grams of gel, the probe is forced into the gel at the speed of 0.2 mm/sec to a penetration distance of 4.0 mm. The hardness of the gel is the force in grams required to force the probe at that speed to penetrate the gel specified for 4.0 mm. Higher numbers signify harder gels.

The tack and stress relaxation are read from the stress curve generated by tracing the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 mm/second. The stress relaxation is the ratio of the initial force ($F_i$) resisting the probe at the pre-set penetration depth minus the force resisting the probe ($F_f$) after 1 min divided by the initial force $F_i$, expressed as a percentage. That is, percent stress relaxation is equal to $$\frac{(F_i - F_f)}{F_i} \times 100\%. \tag{1}$$

where $F_i$ and $F_f$ are in grams. In other words, the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 mm/second from the preset penetration depth.

An alternative way to characterize the gels is by cone penetration parameters according to ASTM D-217 as proposed in Debbaut '261; Debbaut '207; Debbaut '746; and U.S. Pat. No. 5,357,057 to Debbaut et al., each of which is incorporated herein by reference in its entirety. Cone penetration ("CP") values may range from about 70 ($10^{-1}$ mm) to about 400 ($10^{-1}$ mm). Harder gels may generally have CP values from about 70 ($10^{-1}$ mm) to about 70 ($10^{-1}$ mm). Softer gels may generally have CP values from about 200 ($10^{-1}$ mm) to about 400 ($10^{-1}$ mm), with particularly preferred range of from about 250 ($10^{-1}$ mm) to about 375 ($10^{-1}$ mm). For a particular materials system, a relationship between CP and Voland gram hardness can be developed as proposed in U.S. Pat. No. 4,852,646 to Dittmer et al.

According to some embodiments, the gel has a Voland hardness, as measured by a texture analyzer, of between about 5 and 100 grams force. The gel may have an elongation, as measured by ASTM D-638, of at least 55%. According to some embodiments, the elongation is of at least 100%. The gel may have a stress relaxation of less than 80%. The gel may have a tack greater than about 1 gram.

While, in accordance with some embodiments, the sealants 474, 476 are gels as described above, other types of sealants may be employed. For example, the sealants 474, 476 may be silicone grease or hydrocarbon-based grease.

According to some embodiments, the sealant patches 474, 476 are patches of gel sealant as described above and the GTB layer 460 is extended beneath the gel sealant patches 474, 476 and thereby interposed between the patches 474, 476 and the wrap-around body 410. The GTB layer 460 may serve as an anti-poisoning barrier layer that prevents or inhibits chemicals from the body 410 from contacting the gel sealant 474, 476. Such chemicals may poison and degrade the performance of the gel sealant. According to some embodiments and as illustrated, the GTB layer 460 is directly bonded to the body 410 and the gel sealant 474, 476 is directly bonded or in contact with the GTB layer 460.

According to some embodiments, the chemicals from the body 410 that are blocked by the GTB layer 460 are reactive chemical agents used in the manufacture of the wrap-around body 410. In some embodiments, the reactive chemical agents are chemical cross-linking agents. When such chemical cross-linking agents leach into a silicone gel sealant as discussed above, they may cause the gel sealant to crystallize or harden, thereby compromising the performance of the gel sealant.

According to some embodiments, the wrap-around body 410 is formed of EPDM or polyethylene, the GTB layer 460 is mounted on the inner surface 417 (e.g., by coating, laminating, or co-extruding), and the gel sealant 474, 476 is thereafter mounted on the GTB layer 460. In some embodiments, forming the body 410 includes using a cross-linking agent to cross-link the material of the body 410. In some embodiments, the gel sealant is applied to the GTB layer 460 as a liquid, curable sealant material, and is then cured in situ on the GTB layer 460 into the gel sealant 474, 476.

Figure 13:
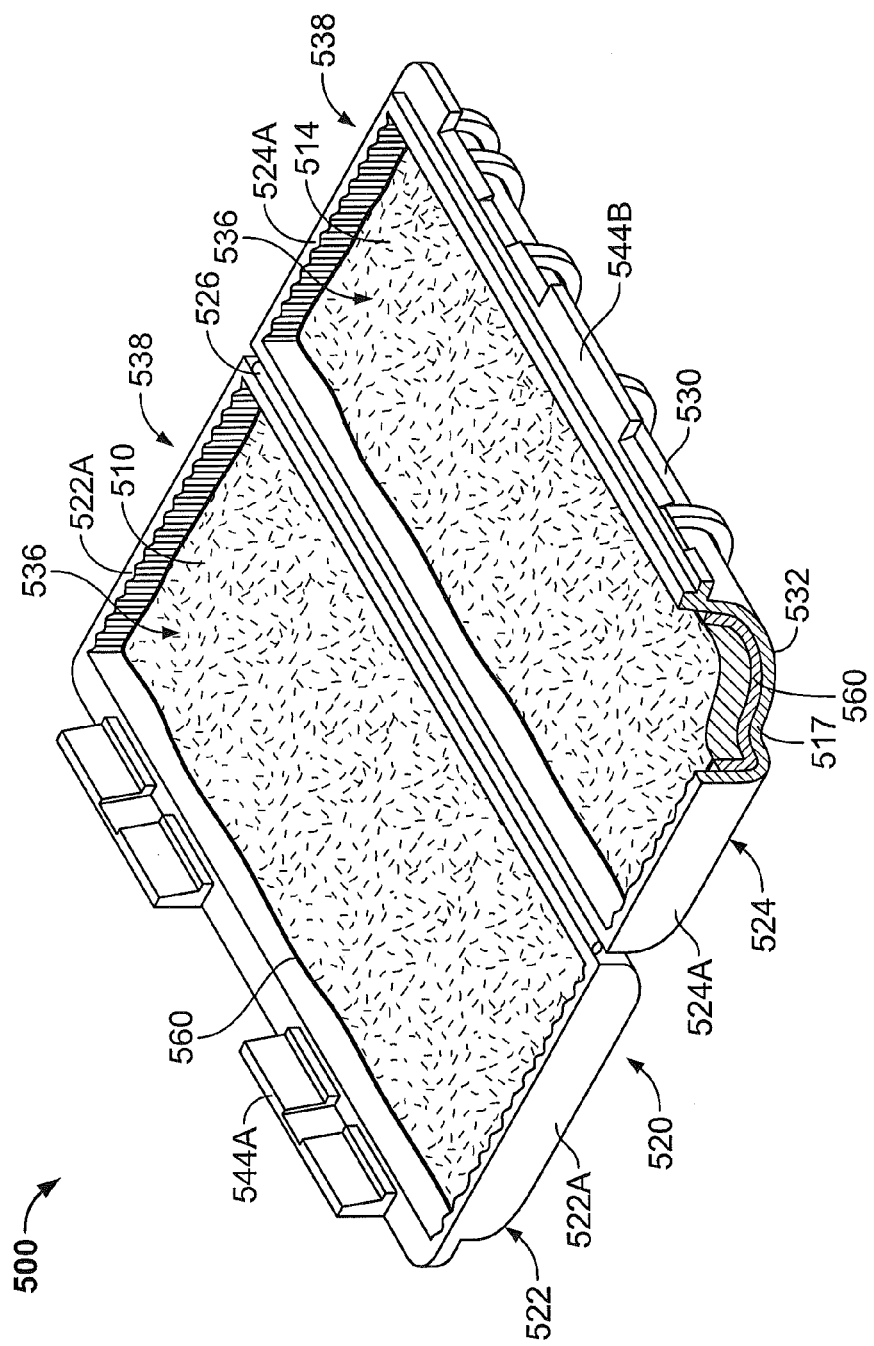
FIG. 13 is a fragmentary, perspective view of a sealant-filled enclosure according to further embodiments of the present invention.

With reference to FIG. 13, a sealant filled enclosure assembly 500 according to further embodiments of the present invention is shown therein. The enclosure assembly 500 is adapted to form a sealed environmentally protective enclosure about a connection and/or cables (e.g., electrical power lines) or the like.

The sealant-filled enclosure 500 includes a housing 520 and masses of gel sealant 510, 514 disposed therein. According to some embodiments, the gel sealant is a gel sealant as described above with regard to patches 474, 476. The housing 520 includes a first shell or cover member 522 and a second shell or cover member 524 joined to one another by a hinge 526 and adapted to move between an open position as shown in FIG. 13 and a closed position wherein the cover members 522, 524 are face to face. In other embodiments, the cover members 522, 524 are not hinged. The cover members 522, 524 each include a frangible end wall 522A, 524A, though other cable passthrough arrangements may be provided. The cover members 520, 524 may also include integral cooperating latch structures 544A, 544B. In the open position, the enclosure assembly 500 can receive a connection and adjacent portions of conductors. In the closed position, the enclosure assembly 500, including the masses of sealant 510, 514, may operate to seal about and environmentally protect the connection. In the closed position, the enclosure assembly 500 defines an enclosure cavity and one or more ports through the end walls 522A, 524A communicating with the enclosure cavity.

Walls 522A, 524A, 530, 532 of each cover member 522, 524 form a perimeter edge defining an opening 538 and define an overall cover member chamber or cavity 536. The sealants 510, 514 are disposed in the cavities 536 prior to use of the enclosure assembly 500.

The housing 520 may be formed of any suitable material. According to some embodiments, the housing 520 is formed of an electrically insulative polymeric material. In some embodiments, the housing 520 is formed of a vacuum formed or molded polymeric material. The housing 520 may be formed of polypropylene, nylon, polyethylene, ABS and/or PMMA. According to some embodiments, the housing 520 is formed of high density polyethylene (HDPE). The housing 520 may be formed of a flame retardant material.

An anti-poisoning or chemical transmission barrier (CTB) layer 560 is bonded to an inner surface 517 of each cover member 522, 524 defining the cavity 536 thereof. In FIG. 13, one of the CTB layers 560 is visible in the fragmented portion of the cover member 524, the remainders of the CTB layers 560 are obscured in the figure by the gel sealants 510, 514. The CTB layers 560 prevent or inhibit chemicals from the cover members 522, 524 (e.g., reactive chemical agents or chemical cross-linking agents) from contacting and poisoning the gel sealants 510, 514 in the same manner as described above with regard to the GTB layer 460 and the gel sealant patches 474, 476. In other embodiments, the CTB layers 560 may have different areas of coverage. For example, the CTB layers 560 may cover substantially all of the inner surfaces of the cavity 536 that will be exposed to gel sealants in use.

According to some embodiments, the cover members 522, 524 are formed of HDPE, the CTB layer 560 is applied to the inner surfaces 517, and the gel sealant masses 510, 514 are thereafter mounted on and in contact with the CTB layers 560. In some embodiments, forming the cover members 522, 524 includes using a cross-linking agent to cross-link material of the cover members 522, 524. In some embodiments, the gel sealant is applied to the CTB layer 560 as a liquid, curable sealant material, and is cured in situ on the CTB layer 560 into the gel sealant masses 510, 514.

Cover assemblies according to embodiments of the invention may be used for any suitable cables and connections. Such cable assemblies may be adapted for use, for example, with connections of medium voltage cables up to about 46 kV.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A cold-applied cover assembly for environmentally protecting an electrical substrate, the cold-applied cover assembly comprising:
    a cold-applied polymeric cover member configured to surround the electrical substrate; and
    a gas transmission barrier (GTB) layer configured to surround the electrical substrate to define a protected chamber containing the electrical substrate and to inhibit ingress of a gas through the cover assembly into the protected chamber;
    wherein the cold-applied polymeric cover member is a tubular, elastomeric sleeve member defining a passage to receive the electrical substrate;
    wherein the GTB layer is in the form of a helically wound strip; and
    wherein:
        the helically wound strip includes an outer side including a first lateral side section and a second lateral side section;
        the first lateral side section is bonded to an inner surface of the elastomeric sleeve member;
        the second lateral side section is not bonded to the inner surface of the elastomeric sleeve member; and
        the second lateral side section axially successively and slidably underlaps the first lateral side section to permit the helically wound strip to axially telescope.

2. The cold-applied cover assembly of claim 1 wherein the GTB layer has a moisture vapor permeability of less than about 0.08 grams/m$^2$/day.

3. The cold-applied cover assembly of claim 2 wherein a thickness of the GTB layer is less than about 30 microns.

4. The cold-applied cover assembly of claim 1 wherein the GTB layer is interposed between the cold-applied polymeric cover member and the protected chamber.

5. The cold-applied cover assembly of claim 1 wherein the GTB layer includes an adhesive to secure opposed edge portions of the GTB layer to one another.

6. The cold-applied cover assembly of claim 1 wherein the GTB layer includes a metal layer.

7. The cold-applied cover assembly of claim 1 wherein the GTB layer includes a ceramic layer.

8. The cold-applied cover assembly of claim 1 wherein the GTB layer includes a layer of polytetrafluoroethylene (PTFE).

9. The cold-applied cover assembly of claim 1 wherein the GTB layer includes a polymeric film.

10. The cold-applied cover assembly of claim 9 wherein the polymeric film is a biaxially oriented polyethylene terephthalate (BoPET) film.

11. The cold-applied cover assembly of claim 1 wherein the GTB layer is a multilayer composite layer including a polymeric film substrate and a coating layer on the polymeric film substrate.

12. The cold-applied cover assembly of claim 1 wherein the elastomeric sleeve member is formed of EPDM rubber.

13. The cold-applied cover assembly of claim 1 including a holdout, wherein the elastomeric sleeve member is mounted in a radially pre-expanded condition on the holdout and can be selectively released from the holdout to cold shrink to a radially retracted condition on the electrical substrate.

14. The cold-applied cover assembly of claim 13 further including:
- an elastomeric, electrically insulating inner sleeve member mounted on the holdout in a pre-expanded condition; and
- an electrical shield sleeve mounted on and surrounding the inner sleeve member;
- wherein the cold-applied polymeric cover member and the GTB layer are mounted on and surround the electrical shield sleeve.

* * * * *